United States Patent [19]
Ishii et al.

[11] Patent Number: 5,432,636
[45] Date of Patent: Jul. 11, 1995

[54] REAR-PROJECTION SCREEN

[75] Inventors: Masaki Ishii; Yoshihiro Kumagai; Osamu Yoshimura; Ichiro Matsuzaki; Shinichi Asano; Takao Kibushi, all of Niigata, Japan

[73] Assignee: Kuraray Co., Ltd., Kurashiki, Japan

[21] Appl. No.: 251,367

[22] Filed: May 31, 1994

[30] Foreign Application Priority Data

May 31, 1993 [JP] Japan .................. 5-152923

[51] Int. Cl.$^6$ .............................. G03B 21/60
[52] U.S. Cl. ............................................ 359/460
[58] Field of Search ................... 359/443, 452, 460

[56] References Cited
U.S. PATENT DOCUMENTS

| 4,053,208 | 10/1977 | Kato et al. | 350/117 |
| 4,083,626 | 4/1978 | Miyahara et al. | 350/117 |
| 5,146,365 | 9/1992 | Minoura et al. | 359/619 |

Primary Examiner—Richard A. Wintercorn
Attorney, Agent, or Firm—Oblon, Spivak, McClelland, Maier & Neustadt

[57] ABSTRACT

In a rear-projection screen comprising a Fresnel lens and a light-diffusing member such as a lenticular lens sheet, a rise angle in a central region of the Fresnel lens is smaller than a rise angle in an intermediate region thereof (e.g., the former is not larger than 3° and the latter is larger than 3°). The rise angles may preferably gradually increase from the central region of the Fresnel lens toward the intermediate region thereof. The central region of the Fresnel lens may preferably be a region extending within the range of from ¼ to ⅓ from the middle point of a diagonal of the rear-projection screen. Such a Fresnel lens is effective for improving white uniformity in the intermediate region of the rear-projection screen and eliminating color corn in the central region thereof.

5 Claims, 10 Drawing Sheets

REAR-PROJECTION SCREEN

BACKGROUND OF THE INVENTION

1. Field of the Invention

This invention relates to a rear-projection screen used in transmission-type projection television systems.

2. Description of the Related Art

Transmission-type projection television systems (hereinafter "rear-projection TVs") are image display systems in which an optical image is enlarged and projected onto a rear-projection screen from a CRT (cathode-ray tube), a liquid crystal panel or the like through a projection lens so that a large-screen picture can be obtained.

FIG. 7 shows an example of the constitution of such a rear-projection TV. As shown in the drawing, in the rear-projection TV, optical images sent from CRTs 1 respectively corresponding R (red), G (green) and B (blue) are enlarged through projection lenses 2 and formed as an image onto the surface of a rear-projection screen 3. The rear-projection screen 3 is comprised of a set of two sheets one of which is a Fresnel lens 4 for directing the light made incident from the projection lenses, toward the position of a viewer and the other of which is a light-diffusing member such as a lenticular lens sheet for dispersing the light emerging from the Fresnel lens 3, in the horizontal and vertical directions to expand a visual angle.

This Fresnel lens 4 is formed of a convex lens, having the structure wherein the lens surface of a convex lens shown in FIG. 8 is divided in a concentric form and divided surfaces are stepwise arranged over a plane as shown in FIG. 8. Thus, the Fresnel lens 4 has on its lens surface a Fresnel surface 4x serving as a lens surface of the convex lens and a surface called a rise surface 4y formed between the divided Fresnel surfaces. As also shown in FIG. 9, an angle formed by the plane surface of the Fresnel lens 4 and the Fresnel surface 4x is called a Fresnel angle $\eta$, and an angle formed by a normal of the Fresnel lens 4 and the rise surface 4y is called a rise angle $\theta$.

Fresnel lenses are usually produced by the 2P (photopolymerization) process or compression molding, where a mold (a tooling) obtained by cutting a metal plate or the like with a lathe is used. The cutting to obtain the mold is carried out using a cutting tool having a nose angle of about 30° to about 90°. In this cutting, as shown in FIG. 12, a side y of a mold 7, the side shaped after the nose of a cutting tool has run, forms the rise surface of the Fresnel lens, and a cut surface x, the surface shaped in the direction the cutting tool 6 drives, forms the lens surface of the Fresnel lens. So long as the Fresnel angle $\eta$ is small enough for the sum of the Fresnel angle $\eta$ and the nose angle of the cutting tool to be 90° or less, the Fresnel angle $\eta$ is determined by the position of the cutting tool 6 (the inclination of its surface with respect to the plane of the Fresnel lens), and the rise angle $\theta$ by the direction in which the cutting tool 6 drives. Thus, the Fresnel angle $\eta$ and the rise angle $\theta$ are determined independently of each other. On the other hand, as the Fresnel angle $\eta$ becomes larger, the mold 7 comes to be cut with the cutting tool 6 on the both sides of its nose, and also the rise angle $\theta$ becomes larger with an increase in the angle $\eta$. For example, assume that a cutting tool having a nose angle of 50° is used, the rise angle $\theta$ is as follows when the Fresnel angle $\eta$ is larger than 40°:

Rise angle $\theta \geq$ (Fresnel angle $\eta$ + nose angle 50°) − 90°

FIG. 1 shows the relationship between radii of Fresnel lenses and rise angles thereof. As shown therein by Case-(a), a conventional Fresnel lens has a region having a constant rise angle $\theta$ determined by a cutting angle of the nose and an outlying region in which the rise angle $\theta$ has become larger with an increase in the Fresnel angle $\eta$. The rise angle $\theta$ is kept at about 1° in the region in which the rise angle $\theta$ is constant in Case-(a). This is to make it easy to release a molded product from the mold.

Incidentally, in recent years, the rear-projection TV as shown in FIG. 7 is required to have a smaller depth, and the distance between the projection lens 2 and the rear-projection screen 5 has become shorter accordingly. In such a case, the size of each CRT 1 and each projection lens 2 can not be changed because the brightness of the picture must be ensured. Hence, the optical axes of light rays from the red R and blue B projection systems with respect to the optical axis of light ray from the green G projection system each have a larger angle (hereinafter "convergent angle") $\epsilon$. This has caused the problem of a lowering of white uniformity, which is a difference in color tones at some positions on the screen being viewed. For example, in the case of a TV set having a diagonal of 40 inches and a large convergent angle, a problem may occur such that, as shown in FIG. 10, yellow and cyan coloring is seen in an intermediate region extending over a radius of about 200 to 300 mm around the center of its screen when white-raster signals are inputted and the screen is viewed at a distance of about 3 m in front of the rear-projection screen.

Another problem may also occur such that, as shown in FIG. 11, coloring called color corn is seen in a central region standing at about 150 mm above the center of the screen when white-raster signals are inputted to a rear-projection TV and the screen is viewed at a distance of about 1.5 m in front of the rear-projection screen and at an angle of 30° upwards.

SUMMARY OF THE INVENTION

The present invention intends to solve the above problems involved in the prior art. An object of the invention is to eliminate both the coloring that may occur in the intermediate region of the rear-projection screen and the coloring that may occur in the central region thereof.

To achieve the object stated above, the present invention provides a rear-projection screen comprising a Fresnel lens and a light-diffusing member, wherein a rise angle in a central region of said Fresnel lens is smaller than a rise angle in an intermediate region thereof.

In a preferred embodiment of the above rear-projection screen, the rise angles gradually increase from the central region of the Fresnel lens toward the intermediate region thereof.

In another preferred embodiment of the above rear-projection screen, the central region of the Fresnel lens is a region extending within the range of from ¼ to ⅓ from the middle point of a diagonal of the rear-projection screen and the intermediate region is a region adjacently standing outside the central region.

DETAILED DESCRIPTION OF THE INVENTION

The rear-projection screen of the present invention comprises a Fresnel lens and a light-diffusing member such as a lenticular lens sheet, and the Fresnel lens used therein comprises a Fresnel lens having, in its central region, a rise angle made smaller so that light rays emergent from Fresnel surfaces after their total reflection on rise surfaces decrease with respect to light rays initially incident on the Fresnel lens in that region, and, in its intermediate region adjacently standing outside the central region, a rise angle made larger than that in the central region so that light rays incident on rise surfaces after their emergence from Fresnel surfaces decrease with respect to the light rays incident on the Fresnel lens in that region.

In this way, the rise angles of a Fresnel lens are made different according to the regions of the Fresnel lens. This is based on a discovery made by the present inventors as follows: In order to investigate why conventional rear-projection screens cause the problem of coloring respectively in the central region and the intermediate region, the present inventors made detailed studies on light paths of light rays made incident on a Fresnel lens, taking as an example a rear-projection TV having a screen size of 40 inches, a projection distance of 730 mm, which is a distance between a projection lens and the screen, a convergent angle ε of 11.5° and a distance of 140 mm between the respective exit pupils of projection lenses. In this case, used as the Fresnel lens was a Fresnel lens having a focal length of 660 mm at its center and 730 mm at its outermost boundary with a gradual increase from the center toward the outermost boundary and having rise angles changing as shown by Case-(a) in FIG. 1. Results obtained are shown in FIGS. 2 to 6.

Figure 2:
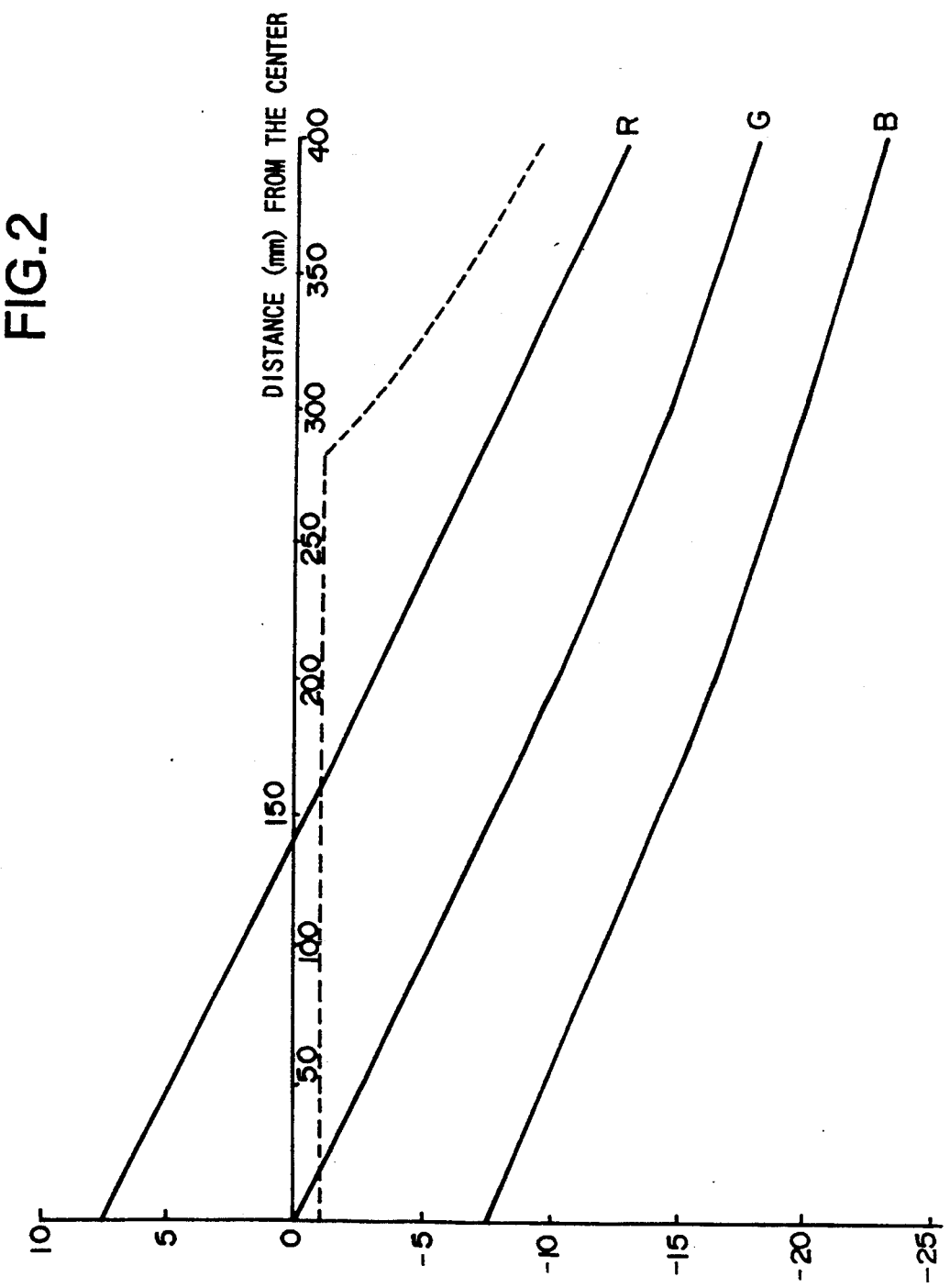
FIG. 2 shows angles of light rays passing inside a Fresnel lens, which are shown with reference to distance from the center of the Fresnel lens.

FIG. 2 shows angles formed inside a Fresnel lens by light rays of red R, green G and blue B colors and a normal of the Fresnel lens (i.e., angles of light rays inside Fresnel lens), which are shown with reference to distance from the center of the Fresnel lens. In FIG. 2, plus signs indicate the direction of convergence, and minus signs, the direction of divergence. A broken line indicates the rise angles in Case-(a).

Figure 3:
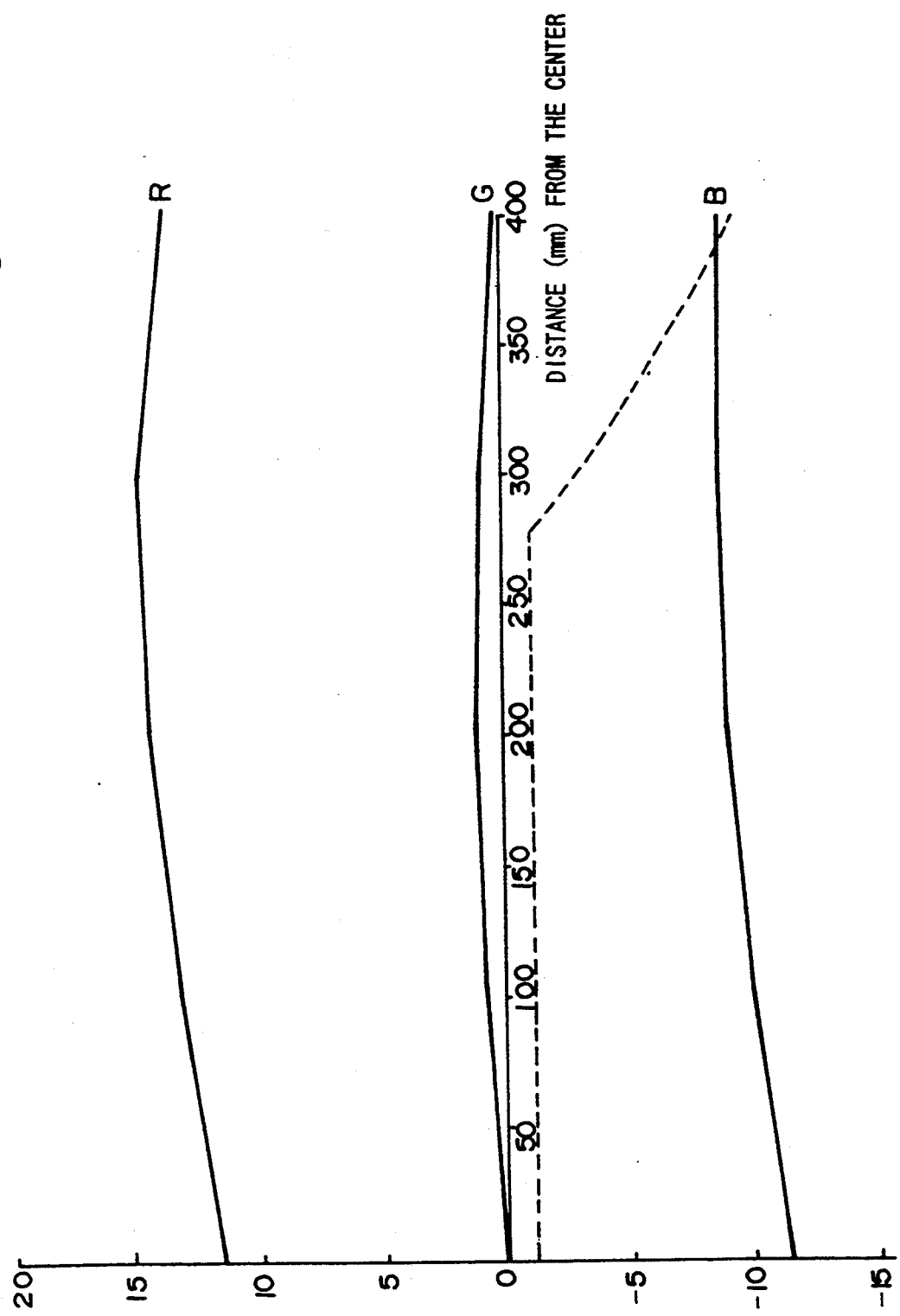
FIG. 3 shows angles of light rays having emerged from a Fresnel lens, which are shown with reference to distance from the center of the Fresnel lens.

FIG. 3 shows angles formed by light rays of red R, green G and blue B colors, having emerged from a Fresnel lens, and a normal of the Fresnel lens (i.e., angles of light rays emergent from Fresnel lens), which are shown with reference to distance from the center of the Fresnel lens. In FIG. 3 also, a broken line indicates the rise angles in Case-(a). As is seen from FIG. 3, only blue B light is emergent in the direction of divergence over the whole region of the Fresnel lens.

Figure 4A:
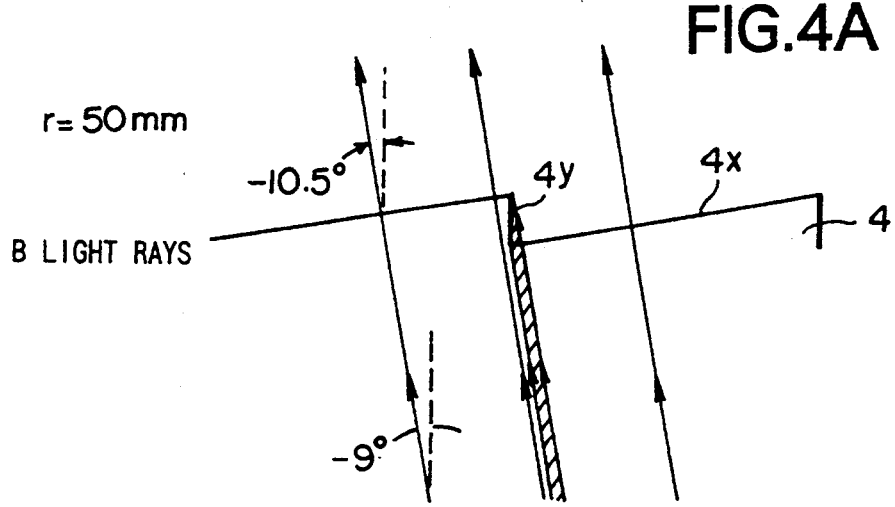
FIG. 4 illustrates light paths at a position of a 50 mm radius of the Fresnel lens center.
Figure 4B:
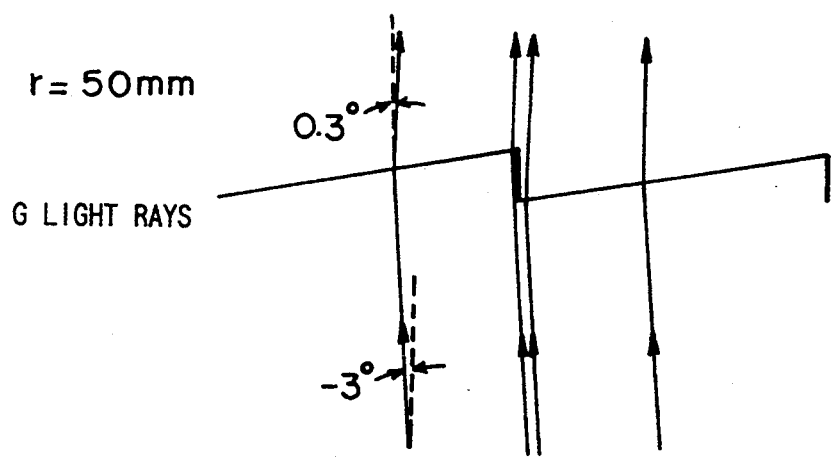
Figure 4C:
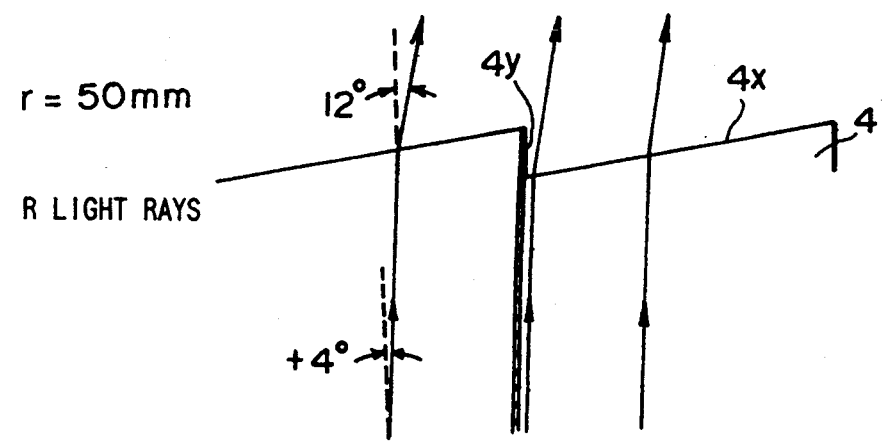

FIG. 4 illustrates light paths of light rays of red R, green G and blue B colors at a position of a 50 mm radius of the Fresnel lens 4. As is seen from FIG. 4, with regard to B light rays, light rays in the shaded zone fall on a rise surface 4y after their emergence from a Fresnel surface 4x (hereinafter, this phenomenon is called Phenomenon-A). With regard to R light rays, light rays in the shaded zone fall on a rise surface 4y before their emergence from the Fresnel lens (hereinafter, this phenomenon is called Phenomenon-B).

In order to study Phenomenon-A and Phenomenon-B in detail, light paths at positions of a 25 mm radius and a 250 mm radius of the Fresnel lens center were followed up. Results obtained are shown in FIGS. 5 and 6 (25 mm radius and 250 mm radius, respectively).

Figure 5:
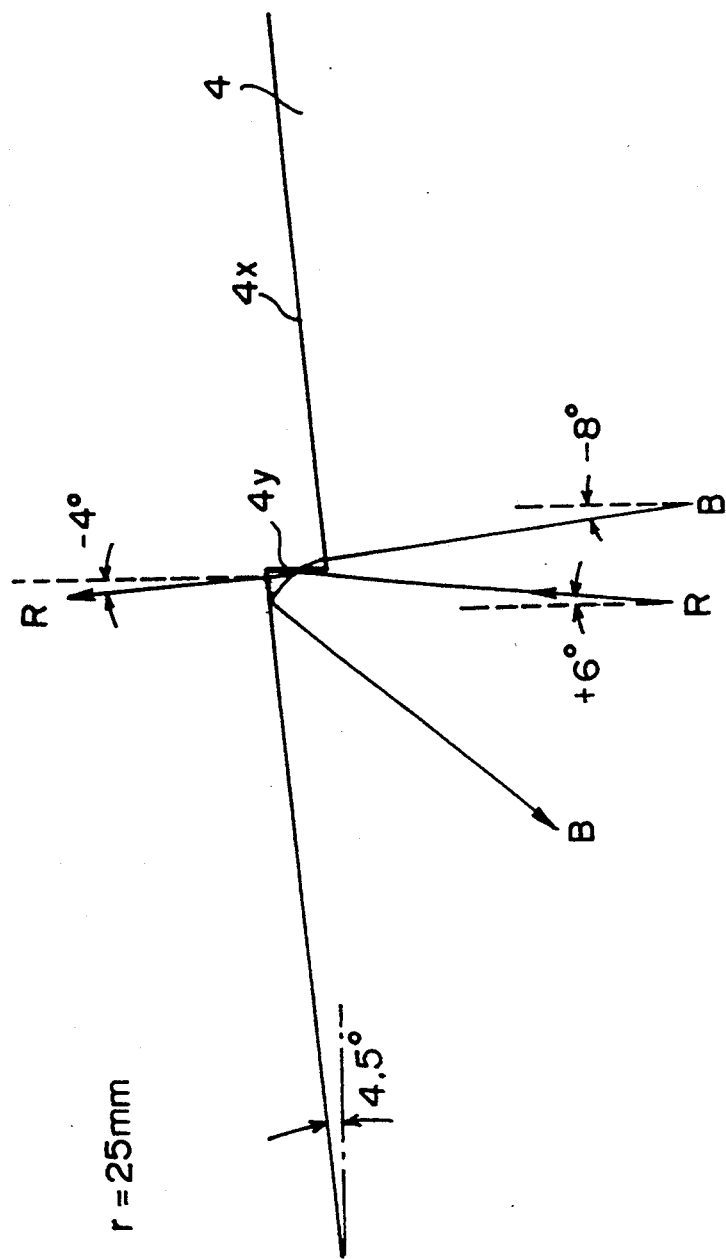
FIG. 5 illustrates light paths at a position of a 25 mm radius of the Fresnel lens center.

As is seen from FIG. 5, at the position of a 25 mm radius of the Fresnel lens center, the R light rays exhibit Phenomenon-B, the phenomenon of light rays falling on a rise surface 4y before their emergence from the Fresnel lens, fall on the rise surface 4y, thereafter totally reflect thereon and are emergent from the Fresnel surface 4x in the direction of divergence at an angle of 4°. Not shown in the drawing, at right-and-left symmetrical positions of the 25 mm radius, B light rays similarly exhibit Phenomenon-B and are emergent in the direction of divergence. Thus, the color corn is presumed to be ascribable to the presence of light rays emergent in the direction of divergence, in the central region of the Fresnel lens. In FIG. 5, the B light rays exhibit Phenomenon-A, the phenomenon of light rays falling on a rise surface 4y after their emergence from a Fresnel surface 4x, but enter into the Fresnel lens from the rise surface 4y and thereafter totally reflect on the Fresnel surface 4x. Hence, such B light rays are presumed to have no ill influence on the picture.

Figure 6:
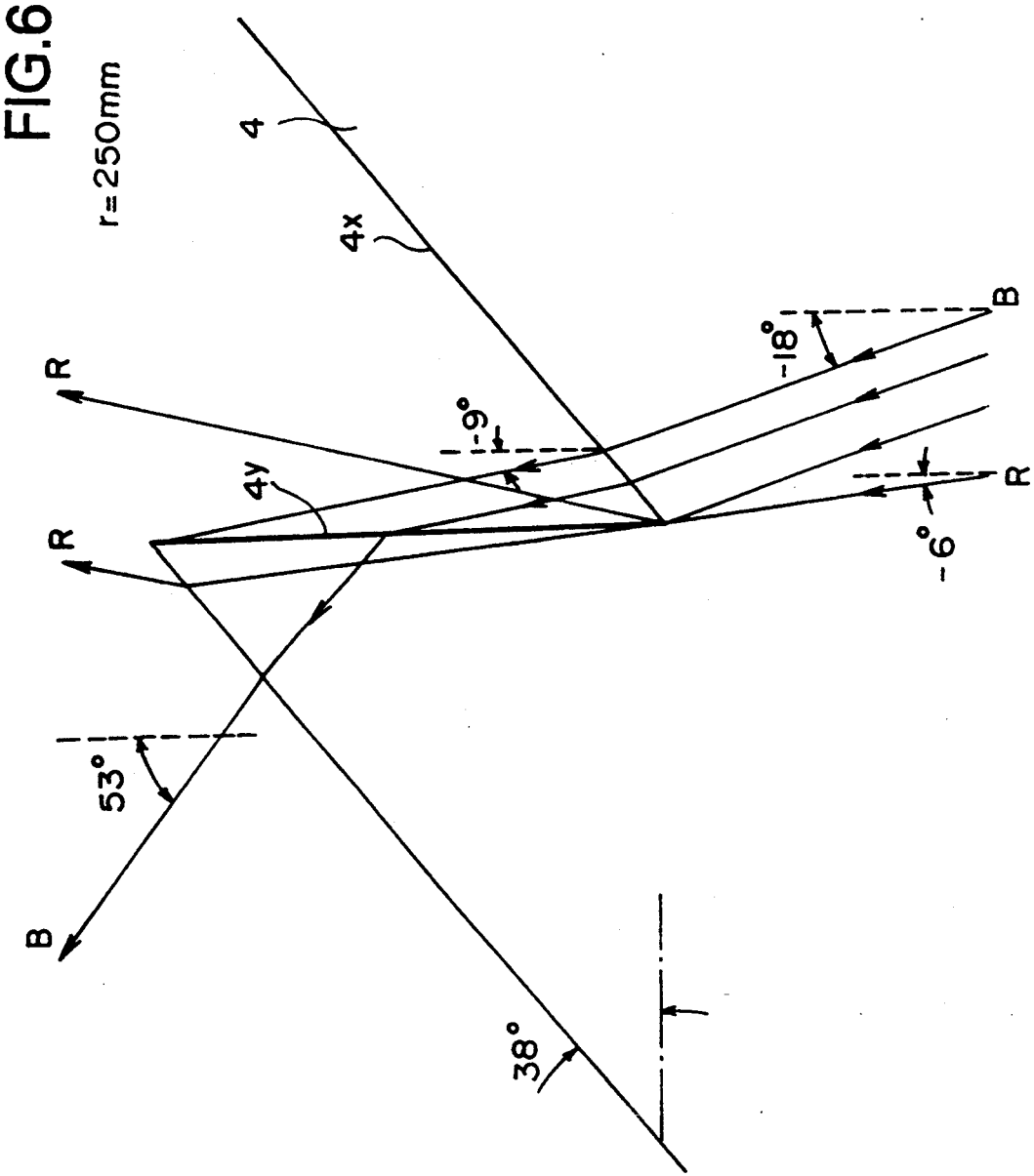
FIG. 6 illustrates light paths at a position of a 250 mm radius of the Fresnel lens center.
Figure 7:
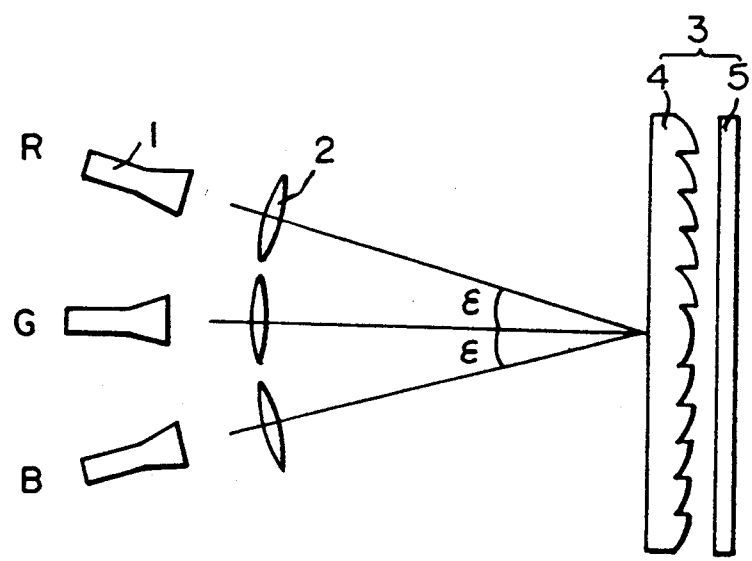
FIG. 7 schematically illustrates the constitution commonly used in rear-projection TVs making use of a rear-projection screen.
Figure 8:
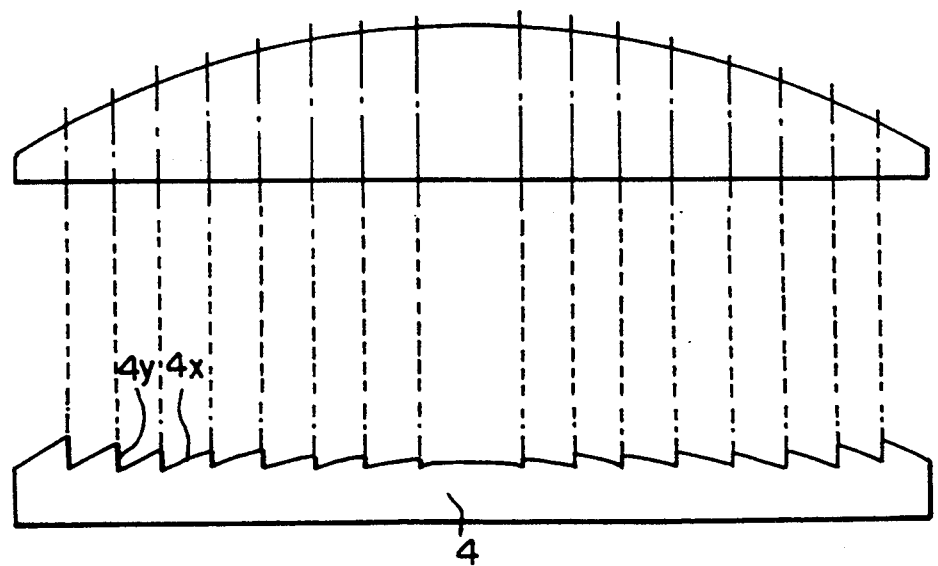
FIG. 8 is a cross section of a Fresnel lens.
Figure 9:
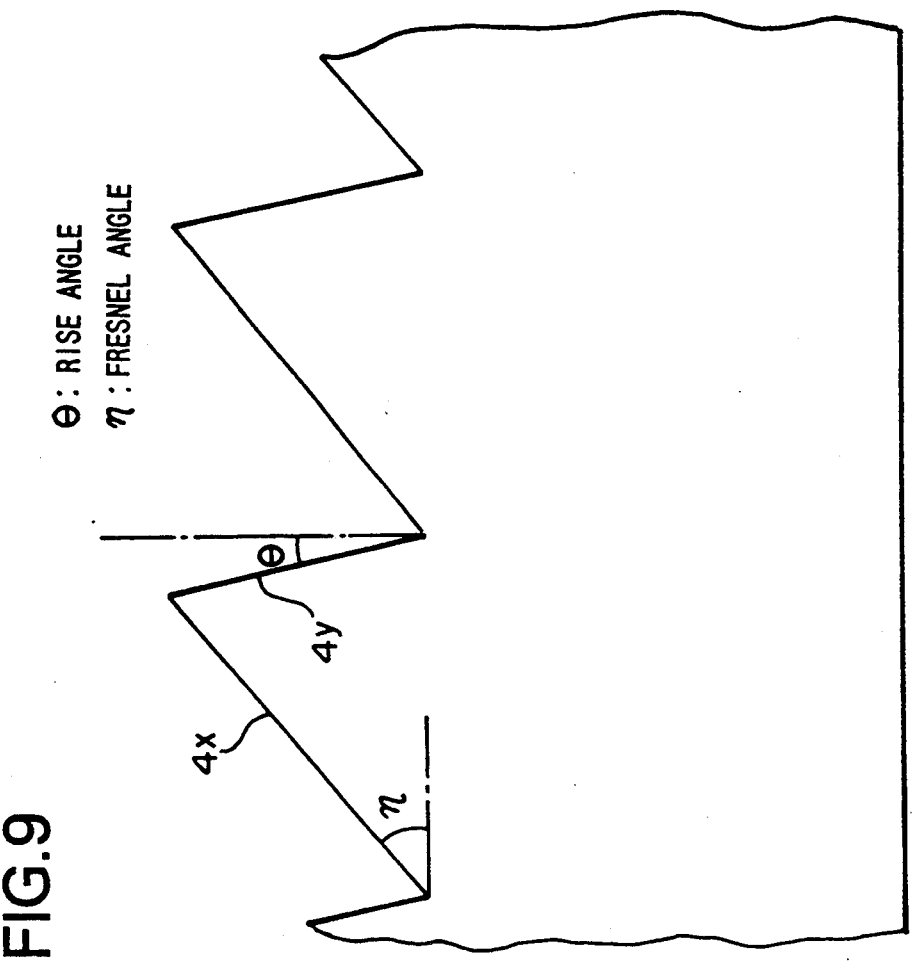
FIG. 9 is a partially enlarged view of a Fresnel lens.

As is also seen from FIG. 6, at the position of a 250 mm radius of the Fresnel lens 4, the R light rays do not exhibit Phenomenon-B, the phenomenon of light rays falling on a rise surface 4y before their emergence from the Fresnel lens. However, the B light rays exhibit Phenomenon-A, the phenomenon of light rays falling on a rise surface 4y after their emergence from a Fresnel surface 4x, where they fall on a rise surface 4y, thereafter enter into the Fresnel lens and are emergent from the Fresnel surface 4x in the direction of divergence at an angle of 53°. Moreover, the proportion of the B light rays that exhibit Phenomenon-A reasonably increases. As a result, the whole light rays to be projected on the screen become short of B light rays in reasonable quantities, so that the screen causes a color shift from white toward yellow. The color shift thus caused is presumed to be the coloring caused in the intermediate region extending over a radius of about 200 to 300 mm around the center of the screen.

As stated above, the present inventors have discovered that the coloring that may occur in the central region of the screen is caused by Phenomenon-B, the phenomenon of light rays falling on a rise surface before their emergence from the Fresnel lens, and the coloring that may occur in the intermediate region of the screen is caused by Phenomenon-A, the phenomenon of light rays falling on a rise surface after their emergence from a Fresnel surface. Now, in the present invention, the Fresnel lens has, in the central region thereof, a rise angle $\theta$ made smaller so that light rays which fall on rise surfaces before their emergence from the Fresnel lens and emerge from Fresnel surfaces in the direction of divergence after their total reflection on the rise surfaces decrease with respect to light rays initially incident on the Fresnel lens in that region. The Fresnel lens also has, in the intermediate region thereof, a rise angle $\theta$ made larger then that in the central region thereof so that light rays incident on rise surfaces after their emergence from Fresnel surfaces and further emergent from the Fresnel surfaces in the direction of divergence decrease with respect to the light rays incident on the Fresnel lens in that region.

The degree of the rise angles determined according to the regions of the Fresnel lens in this way may depend on the projection distance, the distance between the respective projection lenses, the refractive index of the Fresnel lens, the focal length of the Fresnel lens and so forth. In general, the rise angles may preferably be set not larger than 3° in the central region of the Fresnel lens, and may preferably be set larger than 3° in the intermediate region thereof. For example, as shown by Case-(c) in FIG. 1, the Fresnel lens used in the present invention has e rise angle of not larger than 2° in its central region and a rise angle not smaller than 4° in the region outside the central region. On the other hand, when the rise angles are made constant at about 1° throughout the central region and the intermediate region as previously shown by Case-(a), the coloring ascribable to the aforesaid Phenomenon-A tends to occur in the intermediate region of the screen. When the rise angles are made constant at about 5° throughout the central region and intermediate region as shown by Case-(b) in FIG. 1, the coloring ascribable to the aforesaid Phenomenon-B tends to occur in the central region of the screen.

In the present invention, where the rise angles of the Fresnel lens are made different between the central region of the Fresnel lens and the intermediate region adjacently standing outside the central region, there are no particular limitations on the mode of changes on whether the rise angles are discontinuously changed or continuously changed. As shown by Case-(c) in FIG. 1, the rise angles may be discontinuously changed between the central region and the intermediate region. As also shown by Case-(d) in FIG. 1, the rise angles may be made constant in both the central region and the intermediate region and may be gradually changed at a boundary between the both. As still also shown by Case-(e) in FIG. 1, the rise angles may be gradually changed through the whole regions extending from the center toward the intermediate region. In usual instances, the rise angles may preferably be gradually changed as shown by Case-(d) or Case-(e). This makes it possible to prevent reflected external light from being viewed in a discontinuous form. In particular, this is preferable since the screen can have an improved uniformity when pictures projected on rear-projection screens are dark.

Figure 1:
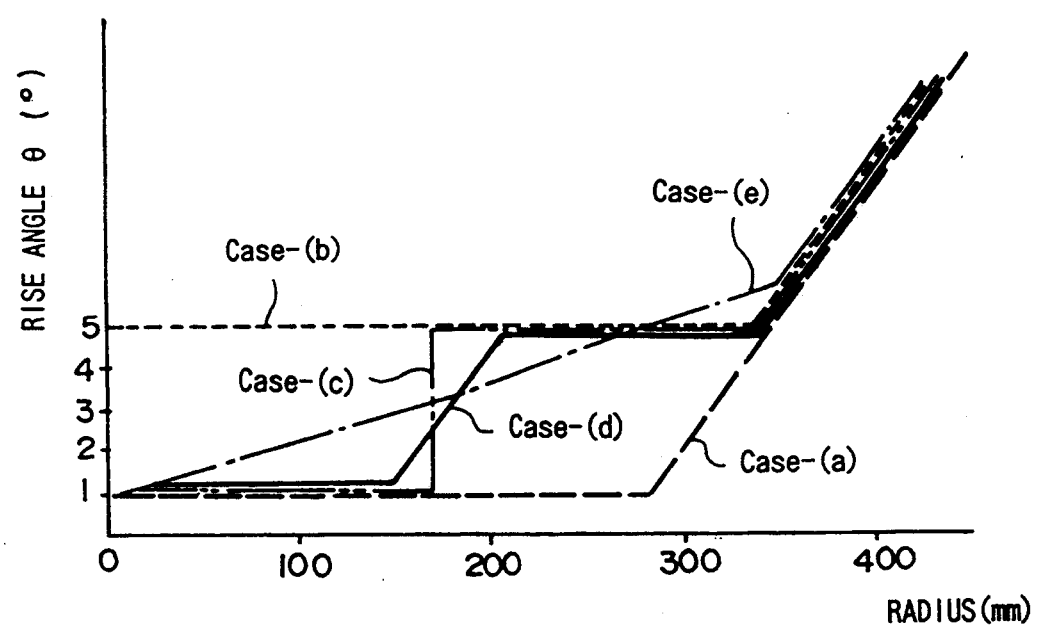
FIG. 1 shows the relationship between radii and rise angles θ of Fresnel lenses in rear-projection screens according to the present invention and the prior art.

In the conventional Fresnel lens as shown by Case-(a) in FIG. 1, its border or outlying region extending over a radius of 275 mm or more outside the center also has a larger rise angle than its central region. However, the Fresnel lens used in the present invention is clearly distinguished from conventional Fresnel lenses in that the rise angle in the intermediate region standing more inside than the outlying region and adjacent to the central region is made different from the rise angle in the central region.

The central region, intermediate region and outlying region of the Fresnel lens are distinguished from one another as follows: The central region refers to a radius region in which, in respect of R, G and B light rays inside a Fresnel lens, light Pays whose angles inside Fresnel lens ape in the direction of convergence are present. For example, in FIG. 2, R light Pays are in the direction of convergence in a region extending within about 140 mm distant from the center, and hence the region extending within a radius of about 140 mm from the center is defined as the central region. In general, the central region thus defined stands inside by $\frac{1}{4}$ to $\frac{1}{3}$ from the middle point of a diagonal of the rear-projection screen. Therefore, in general, a rise angle at the part inside by $\frac{1}{4}$ to $\frac{1}{3}$ from the middle point of the diagonal may be set not larger than 3°.

The intermediate region is a region standing outside the central region thus defined, and also a radius region in which, among R, G and B light rays having emerged from a Fresnel lens, light rays incident on rise surfaces are present when the rise angles are made constant throughout the central region and the region adjacent to its outside as shown by Case-(a) in FIG. 1. For example, in FIG. 3, B light rays intersect a broken line (rise angle) at about 380 mm distant from the center, and hence it is seen that in its inside region the B light rays are incident on rise surfaces after their emergence from the Fresnel lens. Thus, the region extending outside an about 140 mm radius and within a 380 mm radius is defined as the intermediate region. The outlying region stands outside the intermediate region thus defined.

Meanwhile, in the present invention, there are no particular limitations on the light-diffusing member. Various types of lenticular lens sheets, and a flat plate or flat sheet comprising a light-diffusing resin dispersed therein can be used. For example, any of a single-layer lens sheet comprising one resin layer on the entrance side and exit side of which lenses are respectively formed and a double-layer lens sheet comprising resin layers separately formed on the entrance side and the exit side can be used as the lenticular lens sheet. In these lens sheets, light-diffusing particles may be dispersed, and a light absorbing layer may also be formed on the exit side.

EXAMPLES

Example 1

A Fresnel lens having a focal length gradually increasing from 780 to 820 mm from the center toward the outermost boundary was prepared as a Fresnel lens for a rear-projection screen used in a rear-projection TV having a projection length of 850 mm and a convergent angle of 10°. Here, the Fresnel lens was made to have rise angles distributed as shown by Case-(d) in FIG. 1, where the central region had a rise angle of 1°, the intermediate region had a rise angle of 5° and the boundary region extending within a 150 to 175 mm radius had rise angles with gradual changes.

Figure 10:
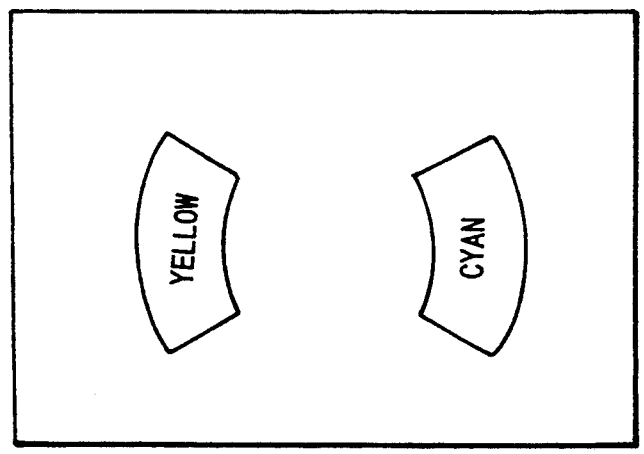
FIG. 10 illustrates how a conventional rear-projection screen is undersirably colored at its intermediate region.
Figure 11:
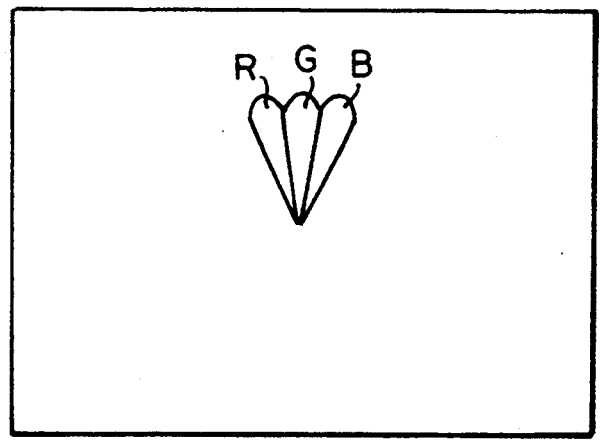
FIG. 11 illustrates how a conventional rear-projection screen is undersirably colored at its central region.
Figure 12:
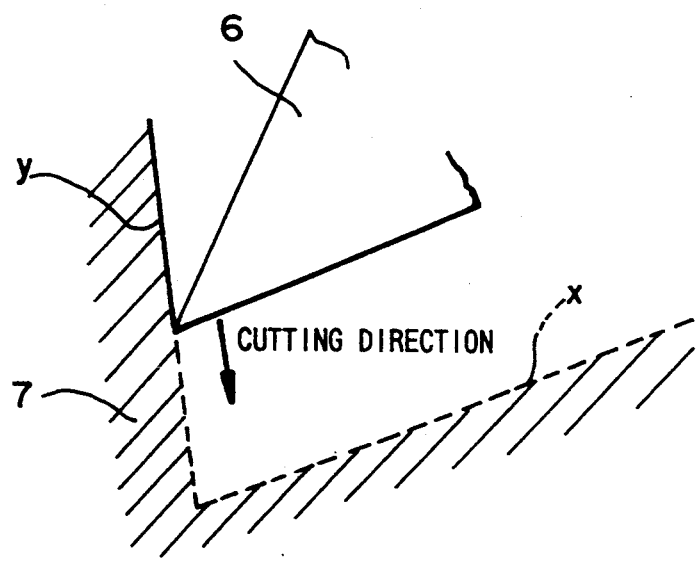
FIG. 12 illustrates a manner by which a mold is cut to produce a Fresnel lens.

This Fresnel lens and a lenticular lens sheet having a peak gain of 8.5 were combined to provide a rear-projection screen, which was then fitted to a TV set and white-raster signals were inputted thereto. The picture thus formed was viewed at a distance of 3 m in front of the rear-projection screen. As a result, the coloring as shown in FIG. 10 was not seen. The picture was also viewed at a distance of 1.5 m in front of the rear-projection screen and at an angle of 30° upwards. As a result, the color corn as shown in FIG. 11 was also little seen.

Comparative Examples 1 and 2

Rear-projection screens were formed in the same manner as in Example 1 except that the Fresnel lens, when prepared, was made to have rise angles distributed so that the rise angles throughout the central region and intermediate region were kept at 1° as shown by Case-(a) in FIG. 1 (Comparative Example 1) or the rise angles throughout the central region and intermediate region were kept at 5° as shown by Case-(b) (Comparative Example 2). The screens obtained were each fitted to a TV set and white-raster signals were inputted thereto. The picture thus formed was viewed at a distance of 3 m in front of the rear-projection screen. As a result, yellow and cyan coloring was seen on the picture formed using the rear-projection screen of Comparative Example 1 at its position of a 200 to 350 mm radius from the center of the screen. No such coloring was seen on the picture formed using the rear-projection screen of Comparative Example 2. The picture was also viewed at a distance of 1.5 m in front of the rear-projection screen and at an angle of 30° upwards. As a result, the coloring of color corn was little seen on the picture formed using the rear-projection screen of Comparative Example 1, but coloring of blue and red strong color corn was seen on the picture formed using the rear-projection screen of Comparative Example 2 at its region within a 150 mm radius from the center of the screen.

What is claimed is:

1. A rear-projection screen comprising a Fresnel lens and a light-diffusing member, wherein a rise angle in a central region of said Fresnel lens is smaller than a rise angle in an intermediate region thereof, said rise angle being defined as an angle formed by a rise surface of said Fresnel lens and a normal of said Fresnel lens.

2. The rear-projection screen according to claim 1, wherein said rise angle in the central region of the Fresnel lens is not larger than 3° and said rise angle in the intermediate region thereof is larger than 3°.

3. The rear-projection screen according to claim 1 or 2, wherein said rise angles gradually increase from the central region of the Fresnel lens toward the intermediate region thereof.

4. The rear-projection screen according to any one of claims 1 to 3, wherein said central region of the Fresnel lens is a region extending within the range of from ¼ to ⅓ from the middle point of a diagonal of the rear-projection screen and the intermediate region is a region adjacently standing outside the central region.

5. The rear-projection screen according to any one of claims 1 to 4, wherein said light-diffusing member comprises a flat plate, a flat sheet or a lenticular lens sheet.

* * * * *